(12) United States Patent
Ahmed et al.

(10) Patent No.: US 8,787,875 B2
(45) Date of Patent: Jul. 22, 2014

(54) AGGREGATING MULTIPLE FUNCTIONS INTO A SINGLE PLATFORM

(75) Inventors: Hassan Ahmed, Andover, MA (US); Anand Krishnamurthy, Acton, MA (US); Terry Durand, Rowsell, GA (US); Tim Mortsolf, Amherst, MA (US); Paul Sherer, Danville, CA (US); Avnish Sikka, Hudson, MA (US)

(73) Assignee: Affirmed Networks, Inc., Acton, MA (US)

( * ) Notice: Subject to any disclaimer, the term of this patent is extended or adjusted under 35 U.S.C. 154(b) by 142 days.

(21) Appl. No.: 13/267,913

(22) Filed: Oct. 7, 2011

(65) Prior Publication Data
US 2012/0190331 A1 Jul. 26, 2012

Related U.S. Application Data

(60) Provisional application No. 61/405,734, filed on Oct. 22, 2010.

(51) Int. Cl.
*H04W 4/00* (2009.01)
*H04L 12/66* (2006.01)
(52) U.S. Cl.
CPC ..................................... *H04L 12/66* (2013.01)
USPC ........................................ 455/410; 455/414.1
(58) Field of Classification Search
USPC .................. 370/230, 349; 455/410, 414.1
See application file for complete search history.

(56) References Cited

U.S. PATENT DOCUMENTS

| 7,346,840 | B1 | 3/2008 | Ravishankar et al. |
| 7,466,694 | B2 | 12/2008 | Xu et al. |
| 7,734,746 | B2 | 6/2010 | Ng et al. |
| 2002/0023048 | A1 | 2/2002 | Buhannic et al. |
| 2004/0267758 | A1 | 12/2004 | Katsurashima |
| 2006/0013191 | A1* | 1/2006 | Kavanagh ..................... 370/349 |
| 2007/0101377 | A1 | 5/2007 | Six et al. |
| 2008/0077465 | A1* | 3/2008 | Schimpf et al. .................... 705/8 |
| 2010/0035587 | A1* | 2/2010 | Bennett ....................... 455/414.1 |
| 2010/0066804 | A1* | 3/2010 | Shoemake et al. ......... 348/14.02 |
| 2010/0188975 | A1* | 7/2010 | Raleigh ...................... 370/230.1 |

OTHER PUBLICATIONS

International Search Report and Written Opinion received for PCT Patent Application No. PCT/US2011/055183, mailed on Mar. 8, 2012, 9 pages.

* cited by examiner

*Primary Examiner* — Myron K Wyche
(74) *Attorney, Agent, or Firm* — Wilmer Cutler Pickering Hale and Dorr LLP (57) ABSTRACT

Methods and apparatus, including computer program products, for aggregating multiple functions into a single platform. A communications system includes at least one processor, at least one computer readable storage medium storing computer executable instructions that, when executed by the at least one processor, implement components including a workflow module comprising sets of workflow instructions for processing different types of information packets, and selectable communication function modules, the workflow module coordinating processing of a received packet using selected ones of the selectable communication function modules.

20 Claims, 5 Drawing Sheets

AGGREGATING MULTIPLE FUNCTIONS INTO A SINGLE PLATFORM

CROSS-REFERENCE TO RELATED APPLICATIONS

This application claims the benefit of U.S. Provisional Application No. 61/405,734, filed Oct. 22, 2010, and titled COMMUNICATIONS METHOD AND SYSTEM AGGREGATING MULTIPLE FUNCTIONS INTO A SINGLE PLATFORM, which is incorporated by reference in its entirety.

BACKGROUND OF THE INVENTION

The invention generally relates computer systems and computer executed methods of aggregating multiple functions into a single platform.

Mobile communications networks typically include many separate elements that function as independent entities. These elements may include firewalls, authentication gateways, service gateways, charging and billing gateways, Hypertext Transfer Protocol (HTTP) proxies, video caches, and so forth. These elements are often provided by different manufacturers and require element-specific skills to operate and maintain. Current communications systems have limited speed due in part to the number of diverse elements and the processing that each element perform. Thus, it is difficult and expensive for mobile carriers such as AT&T® Wireless and Verizon® Wireless, to create new services due to the number of elements involved and the diverse expertise required for each element.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for aggregating multiple functions into a single platform.

In general, in one aspect, the invention features a communications system including at least one processor, at least one computer readable storage medium storing computer executable instructions that, when executed by the at least one processor, implement components including a workflow module comprising sets of workflow instructions for processing different types of information packets, and selectable communication function modules, the workflow module coordinating processing of a received packet using selected ones of the selectable communication function modules.

In another aspect, the invention features a method including, in a wireless network, receiving an information packet at an input to a wireless communication apparatus, and employing a processor executing computer executable instructions stored on a computer readable storage medium to perform the following functions: accessing a workflow module comprising rules for processing different types of information packets, determining which one of selectable communication function modules is required to process the received information packet using the rules of the workflow module, and processing the received packet using at least one of the selectable communication function modules.

In another aspect, the invention features apparatus for wireless communication including a network interface receiving information packets from a first network entity, and a computing platform processing the received packets, the computing platform including a workflow module, and selectable communication function modules, the workflow module coordinating processing of the received packets using selected ones of the selectable communication function modules, the network interface further transmitting processed information packets to a second network entity.

In another aspect, the invention features a wireless communications apparatus for establishing communication between a first network entity and a second network entity, the apparatus including a network interface receiving information packets from a first network entity, at least one processor, and at least one computer readable storage medium storing computer executable instructions that, when executed by the at least one processor, implement components including a workflow module comprising rules for processing different types of information packets, a deep packet inspection module for inspecting the received packets and providing information about the packets to the workflow module, and selectable communication function modules including a content filtering module, a HTTP proxy module, a video cache module, a video transcoding module, an analytics module, a firewall module, a charging module, a policy enforcement module, a traffic steering module and a latency service module, the workflow module coordinating processing of the received packets using selected ones of the selectable communication function modules and the network interface further transmits processed information packets to a second network entity, establishing communication between the first and second network entities.

BRIEF DESCRIPTION OF THE DRAWINGS

The invention will be more fully understood by reference to the detailed description, in conjunction with the following figures, wherein.

DETAILED DESCRIPTION

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Figure 1:
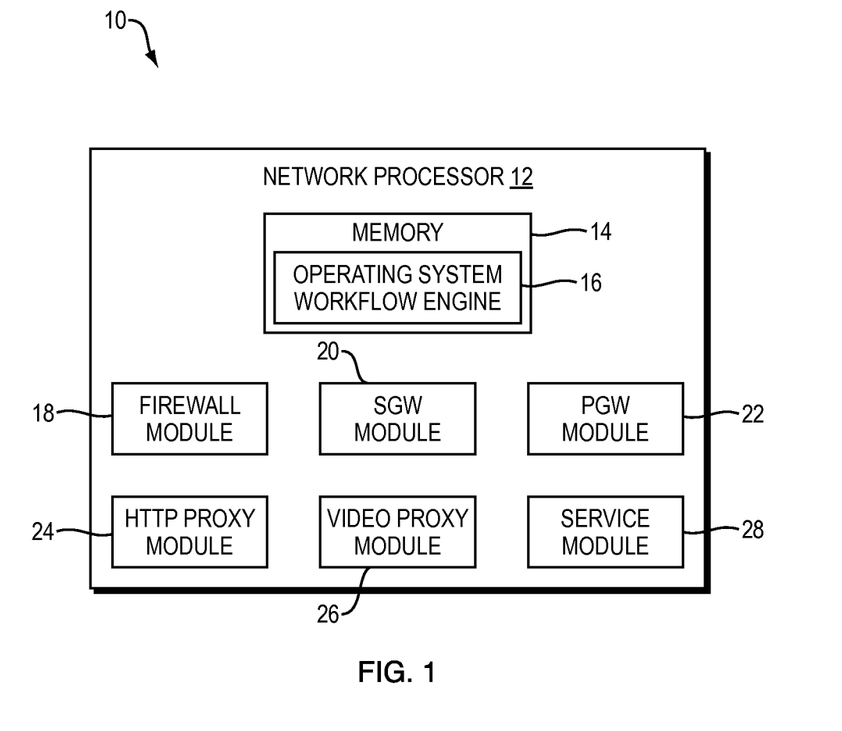
FIG. 1 is a block diagram of an exemplary workflow server.

As shown in FIG. 1, a workflow server 10 includes a network processor 12 and operating system 14. The operating system 14 includes a workflow engine 16. The workflow server 10 includes a network firewall module 18, a serving gateway (SGW) module 20, a packet data network gateway (PGW) module 22, a HTTP Web proxy module 24, a video proxy module 26 and a service module 28.

The SGW module 20 routes and forwards user data packets and acts as an anchor for mobility between LTE and other 3GPP technologies.

The PGW module 22 provides connectivity from user equipment to external packet data networks by being a point of exit and entry of traffic for the user equipment. The PGW module 22 performs policy enforcement, packet filtering for each user, charging support, lawful interception and packet screening.

The HTTP Web proxy module 24 acts as an intermediary for requests from clients seeking resources from other servers. The HTTP Web proxy module 24 provides web caching, web translating and web transcoding.

The video proxy module 26 provides video caching, video translating and video transcoding. In addition, this module provides related services involving content manipulation such as advertisement insertion, splicing content together or rewriting adaptive bit rate manifest files.

The service module 28 provides a number of services, such as, for example, Radius/Diameter, Policy Personal Eventing Protocol (PEP), Packet Forwarding, Content Filtering, Session Management, Domain Name System (DNS) Service, Access Control, Packet Inspection, Session Term, IP Transport I/O, a charging function, a policy enforcement function, a traffic steering function, a latency service function, and so forth.

The charging function refers to an ability to selectively charge mobile subscribers and/or content partners based on a per flow basis by applying differentiated billing plans based on flow characteristics such as volume of packets, amount of time the flow is active, and the application associated with the flow as determined by shallow or deep packet inspection of the packet(s) in the flow or by analyzing the flow heuristics (e.g., signature analysis), or other parameters associated with servicing the flow such as time of day.

The policy enforcement function refers to an ability to apply subscriber related QoS and gating policies to a subscriber flow on a per-flow basis, where the flow is determined by shallow or deep packet inspection, or heuristic analysis (e.g., signature analysis) of the flow pattern.

The latency service refers to an ability to measure network round trip latency between any selected subscriber or set of subscribers and the gateway function in the wireless core.

The workflow engine 16 provides traffic steering to the various modules.

The workflow server 10 enables wireless carriers to logically develop service flows in an entirely automated fashion to create a flow across all the network elements and functions such as firewall, network gateways, charging gateways, content filtering engines, deep packet inspections engines to orchestrate new services. The term "service orchestration" as used herein refers to execution of the work flow engine 16, which steers network traffic and executes a collection of functions and their sequence required to instantiate a service workflow, and the multiple capabilities of the workflow server 10 to instantiate a new carrier defined service. Capabilities such as deep packet inspection, charging, content inspection, and service routing are used as tools and capabilities in the workflow engine 16 to orchestrate new services.

The capability of service orchestration in the workflow server 10 reshapes a creation of services in a carrier network. The workflow server 10 reduces time to market for new services from service conception to service delivery, leading to rapid revenue generation for new services. The workflow server 10 enables improvement in service quality and delivery. The workflow server 10 enables capital expenditure cost reduction due to reduced network integration expenses. The workflow server 10 provides operational expense savings due to minimized need for professional services. The workflow server 10 enables service creation and development flexibility at Layer 4 through 7 and device parameter and programming simplification.

The development and institution of new services in a wireless carrier environment is a complex and time consuming process. The ability of a mobile subscriber to traverse multiple packet data networks (PDNs) due to the devices ability to roam causes even further complexity to roll out new services. Unlike the Internet universal resources locator (URL) routing concept, which selects the server that hosts the application, access point name (APN) traffic routing principles are more catered toward getting a subscriber to the "network element" (GGSN) that owns the data session and not the application server. The home GGSN does not act like an application server but more like a packet forwarding engine to get the session to the next network entity in the service chain. It terminates the GTP tunnel and then uses Layer 3 transport routing rules to get the sessions to the next network element. The next element can be either one of many elements to deliver, manage, or bill the service. Service orchestration includes Layer 3 routing and rules insertion by each specific network element.

In order to orchestrate a service across all of the respective network elements, the carrier must develop a comprehensive Internet Protocol (IP) routing plan to do next route hopping to get to each element that will have a role in invoking, load balancing, charging, content filtering, firewalling, and billing the service. The engineering process to do this is a very labor intensive, complex network integration, and costly endeavor from both a professional services and time to market perspective.

In general, an access point name (APN) identifies an internet protocol (IP) packet data network (PDN), which a mobile data user wants to communicate with. In addition to identifying a PDN, an APN may also be used to define the type of service, e.g., connection to a wireless application protocol (WAP) server or a connection to a multimedia messaging service (MMS), which is provided by the PDN. Because the APN concept was purposefully designed for carrier network selection and routing and not service application selection, and considering time to market complexities, carriers are looking at alternative approaches for how APNs are used in delivering 4G, 3G and LTE services. A majority of the carriers for both their 3G and 4G infrastructure are considering the use of a single APN to run all service on the mobile device. The introduction of a generic APN reduces the complexity of introducing new services by minimizing the device aspects of the APN provisioning. When the carrier implements a single APN the problems of lengthy provisioning sweeps to rollout new services no longer exist. However, the network traffic steering processes for services takes on a greater degree of complexity if steps are not taken to simplify the network traffic flow. The workflow sever 10 simplifies the network traffic service flows through a single automated environment.

Before describing service orchestration in the workflow server 10, we will consider a fairly simplistic analogy of service orchestration in another industry. Let us consider the delivery of a FedEx® parcel from it origination point to its final delivery destination. The first thing that must happen is the FedEx® mail must be addressed by the originator to get to its final destination. This step is analogous to a mobile phone launching the APN with the intent to use, for example, an Internet Browse service. In the case of mail, the addressee, the destination address, city, state, and zip code all play a pivotal role in getting the mail to its final destination with on time delivery. There is nothing done at this point in time to determine what type of parcel it is (e.g., a letter or a box).

In the case of the wireless phone, the APN is the equivalent of addressing the packets from the mobile device for delivery. In the case where carriers use a generic APN, the specific service being requested is not known (e.g., Internet Browse or Video). Going back to the postal example, the automated system in FedEx® looks at the size, weight, delivery destination using bar codes, and sorts the letters from the boxes. It also looks at time delivery commitment intervals and appropriately sorts the parcel. Then using the bar coded label, the parcel is automatically routed to the destination address at each touch point by simply scanning the bar code for destination information. The FedEx® system is a automated rules based system that requires little manual intervention along the delivery path. It recognizes delivery priority, destination, and routing logistics by analyzing the parcel along the various touch points automatically to insure on-time delivery and quality of service to the final destination. These capabilities are needed to automate the carrier's network to facilitate the use of a generic APN to deliver services. However, in the wireless phone example, the network elements are not capable of delivering the same experience because each network element must have a set of rules manually provisioned into it each every time a new service is introduced, whereas the FedEx® system adapts to changes in parcel size, destination, delivery time at each touch point.

In the workflow server 10, workflows enable wireless operators to create service flows and include identification of a service flow via a L4-L7 DPI analyzer, a set of functions with corresponding rules and a sequence that is applied to the service flow. Workflows are created to examine packets at multiple layers in the OSI stack (Layers 4-7) and to define a set of rules to inspect any APN service flow. The service flow can be either generated by the wireless subscriber, the operator, or a content partner to route, charge, bill, filter, or to take any other action such as a Diameter or LDAP query to create a new service or modify an existing one. Workflow rules are constructed using data analyzers. These analyzers are names given to the DPI primitives that indicate the layer of the stack and the type of packet that is used to create the analyzer. For example, a data analyzer to trap a MSISDN of mobile at the GTP layer can be named GTP.MSISDN. The end result of the workflow process is service orchestration or simply stated, the instantiation of a new service in the operators network using an automated process.

The workflow process includes the functions of flow partitioning, flow dispatching and flow pipelining.

Flow partitioning refers to an ability to perform deep packet inspection on service flows and screen for the actionable triggers to trap and analyze the data. Examples include:
HTTP to URL disney.com
DNS for GTP.MSISDN=mickey
TCP with DstPort=8
SKYPE with source_user=mickey and destination_user=Minnie Flow dispatching refers to an ability to take specific action on the returned result(s) of flow partitioning, such as route packets to internal content filters or invoke a LDAP query for subscriber information.
Analytics→log to analytics service named "mobile_latency"
Firewall→perform firewall service named "gatekeeper"
Content Filter→perform parental controls named "nanny"
Charging Filter-> perform charging control named "prepaid"
Calea Filter→perform lawful intercept named "Calea"
Video→Perform video service named "madhatter"
MSISDN→perform LDAP query Flow pipelining refers to an ability to control order and flow dispatching of packets, including an ability to make branch dependent dynamic decisions with flow decisions occurring at each branch.

Let's construct a sample workflow to orchestrate a service on a generic APN using the following flow partitioning rules and flow dispatch. The construct of the rule is as follows:
Flow Partition→Flow Dispatch The first flow partitioning rule is used to examine the service flow from the mobile device to look for a DNS query from the mobile device to specific URLs. Both rules direct the packets from a flow dispatch perspective to the content filter service. The rules are constructed as follows:
DNS (two rule sets listed below)
DNS.URL=*.com→*.com Content Filter
DNS.URL=*.att→att.net Content Filter The next flow partitioning rule is used to examine the service flow from the mobile at the GTP level to look for an ICMP traffic from a specific mobile IMSI and a specific traffic type of ICMP. The rule then takes the result and flow dispatches it towards a service called "Mobile Latency Analytics Service." The rule is constructed as follows:
ICMP (one rule set listed below)
GTP.IMEI =goofy and ICMP.TYPE=ECHO→Mobile Latency Analytics Service The last flow partitioning rule is used to examine the service flow from the mobile at the HTTP level to determine the URL type and the GTP for a specific device. The HTTP rule directs the traffic toward the .com proxy service and GTP rule directs the traffic toward a service labeled "External Transcoders." The rules are constructed as follows:
HTTP (two rule sets listed below)
Http.URL=*.com→*.com Proxy
GTP.DEVICE=U350→External transcoder Service Using the above set of flow partitioning rules and flow dispatch services, let's use the flow pipelining process to orchestrate a couple of services. An example of a service a wireless operator can create using workflow is a relatively simple but very valuable service to analyze the latency of a given set of mobile devices with a range of International Mobile Equipment Identity (IMEI). An example of this type service is to measure latency for all Apple® IPhone® devices in a certain geographical area (e.g., PGW serving area).

Figure 2:
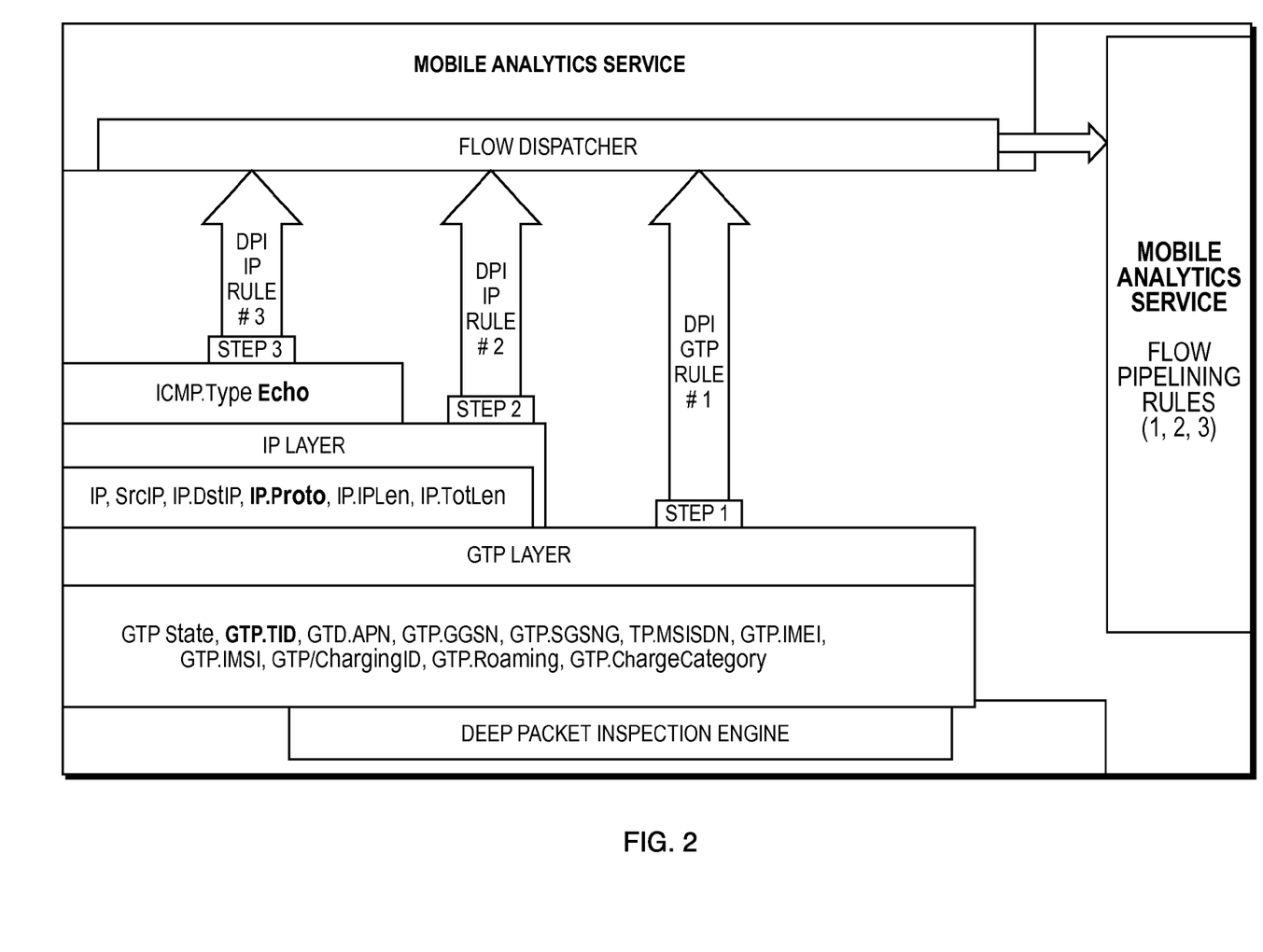
FIG. 2 is an exemplary mobile analytics service workflow.

GTP.IMEI=goofy and IP.TYPE=PROTO and ICMP.TYPE=ECHO→Mobile Latency Analytics Service The new service is instantiated across a generic APN and orchestrated to a latency mobile measurement service named Mobile Latency Analytics. FIG. 2 illustrates an exemplary mobile analytics service workflow.

Figure 3:
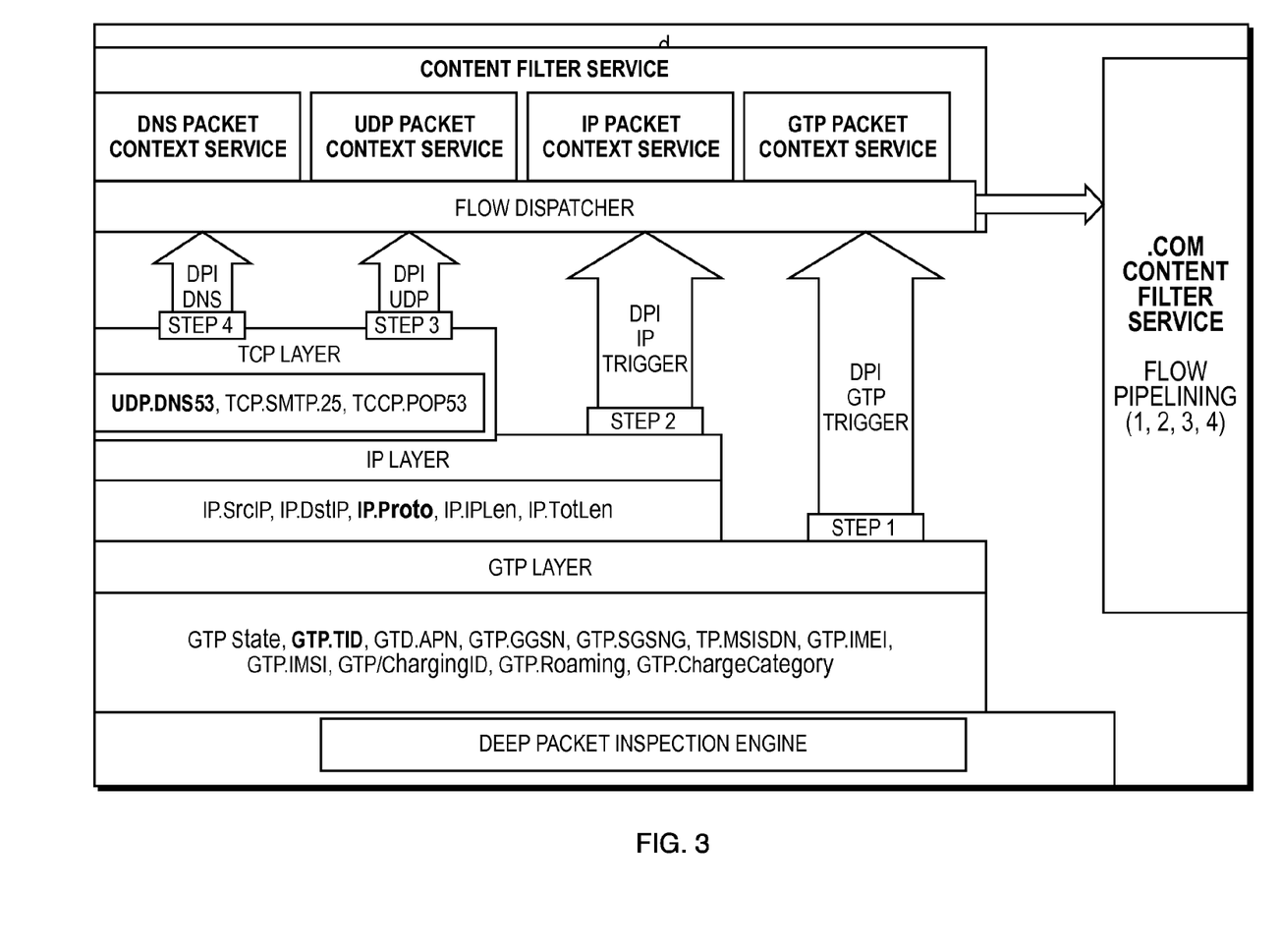
FIG. 3 is an exemplary parental control service workflow.

In another example, a workflow is designed to analyze the traffic flow from a generic APN and steer the traffic to the workflow server 10 content filter for analysis. In this example, the workflow process goes up the TCP Layer to orchestrate the service. This service example depicts the analysis of a URL and dispatches to the content filter for screening of explicit content. This workflow process creates a simple parental control service. The new service is instantiated using the generic APN to orchestrate a service named parental control. In this case there are four flow partitioning rules, each having a different flow dispatch. The flow pipelining process then makes the dynamic branching decisions necessary to orchestrate the service called parental controls. The rules are listed below.

GTP.TID→GTP Packet Context Service
IP.Proto=UDP→IP Packet Context Service
UDP.Port=DNSPort 53→DNS Packet Context Service
DNS.URL→DNS Packet ContextService FIG. 3 illustrates an exemplary parental control service workflow.

Figure 4:
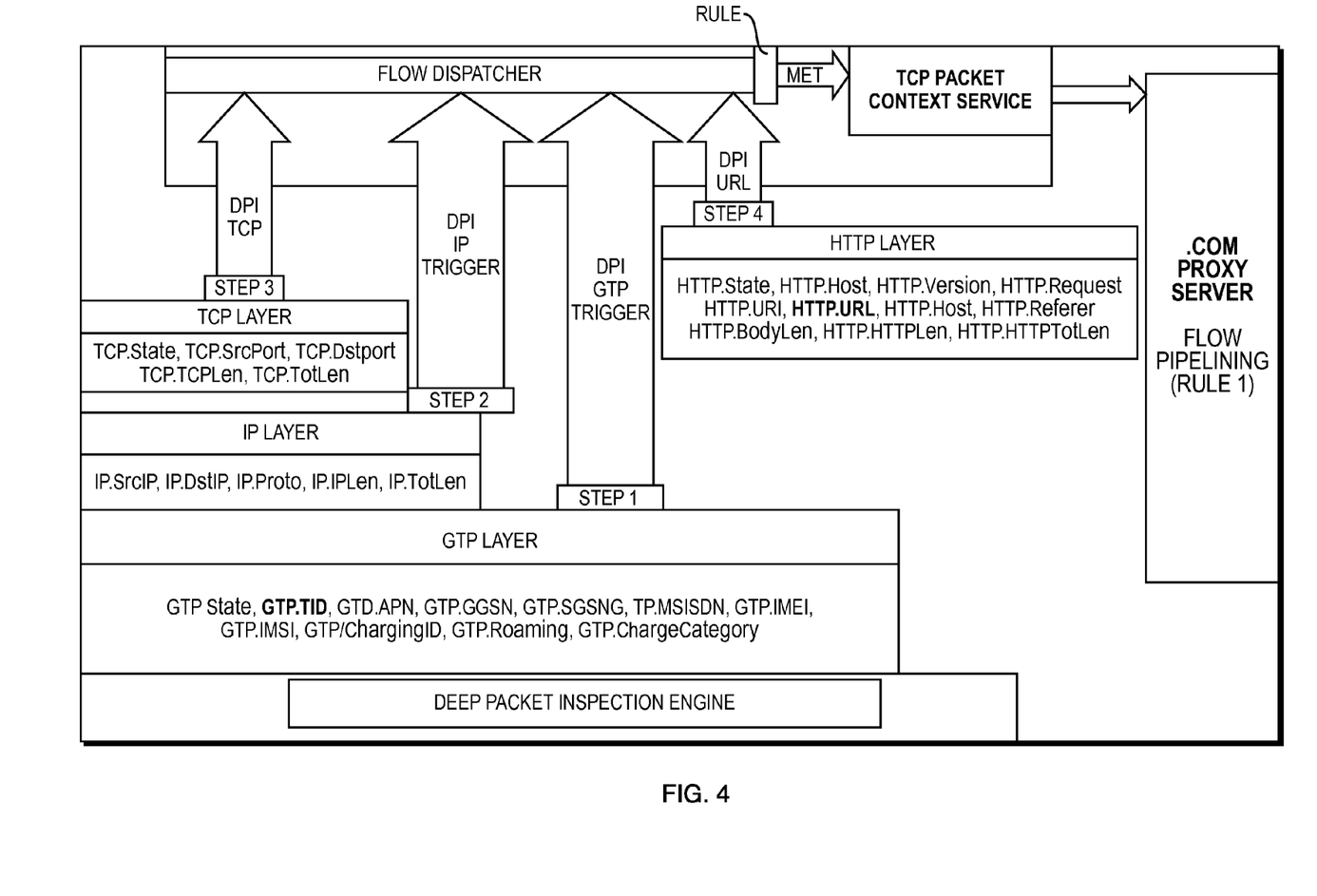
FIG. 4 is an exemplary HTTP service workflow.

In still another example, a work flow is illustrated that analyzes the traffic flow from a generic APN to determine whether to route the traffic to a HTTP proxy. In this example, the work flow process goes up the HTTP layer to orchestrate the service. This service example depicts the analysis of URLs to invoke the .com proxy service on the workflow server 10. In this case, a single flow partitioning rule and flow dispatch is used to create the service. The rule is listed below.

HTTP.URL=*.com→.com Proxy Service

FIG. 4 illustrates an exemplary HTTP proxy service workflow.

The examples above indicate that the workflow process is a very powerful tool that reshapes the manner in which carriers design, provision and implement services in their network. Although the examples given were simplified, the workflow engine 16 enables the creation of multiple flow partitioning rules and facilitates a flow pipelining process to create services of varying complexity in the carrier network.

In order to facilitate the workflow engine 16, the following conventions are used.

The service work flow partitioning process should allow packet inspection at Layer 4-7 of the software stack.

A naming convention for the data analyzers for Layer 4 through 7 should be established in order to build a rule to DPI rule and to analyze the data primitive. An example of a data analyzer is GTP.IMEI that serves as the name of the analyzer to trap International Mobile Equipment Identifier (Phone Type) at the GTP layer.

A suite of data analyzers should be established for the data primitives for Layers 4-7. The suit of analyzers should be broad enough at each layer to allow robust service flow creation.

The workflow process should enable creation of multiple Data Analyzers to be established for at each layer.

The service workflow partitioning process should enable a user to input multiple rules using data analyzers from a single or multiple layers of the software stack.

The workflow engine 16 is the single place to implement service logic and rules for multiple network functions such as firewalls, content filtering, charging, data base queries and other service functions All the functions of the workflow are provisioned from the same user interface screen and there is a single place to workflow engine 16 to validate the rules provisioned as part of the workflow.

The service workflow partitioning process should enable a user to input rules using the IF, AND, OR, and ELSE syntax to create rules.

The service workflow process should enable rules using the IF, OR, AND Syntax to be chained together to create a "Super Rules" statement.

The service workflow dispatch process should enable the rule result to be dispatched and results collected in unique user defined service context.

The service workflow pipelining process should allow logical ordering of multiple service contexts (service branch results) to create a service flow.

The service workflow pipelining process should enable logical ordering of multiple service contexts (service branch results) to create a service.

TEst Mobile System (TEMS) is an Ascom network monitoring and real-time diagnostics suite. The following is a list of TEMS considerations for service flow provisioning in the workflow server 10.

TEMS should allow an operator to provision a new service workflow using an intuitive and user friendly manner from one single GUI interface.

Service workflows provisioning operators should be agnostics to the protocol level details. TEMS shall present user with various filterable attributes at each Layer (4 to 7), during a work flow provisioning flow. The operator should be agnostic to any protocol level details while selecting filtering criteria to define a work flow rule.

Context sensitive service workflows provisioning. TEMS shall present flow partitioning attributes in a context sensitive matter compared to the other flow partitioning attributes provisioned at different protocol layers for the same service work flow.

What the above means is that if stage 'n+1' of partitioning flow attributes depends on stage 'n' then only a valid set of attributes are shown to the user for selection during a service workflow provisioning.

Tabular display of all the service workflows. TEMS shall display all the service workflows provisioned per node (or per network) in a tabular fashion.

Modification of existing service workflows. TEMS shall allow operator to modify an existing work flow by letting them add, modify or delete any rules from an existing service workflows. Operator shall be notified of the impacts to the existing service workflow modifications.

Ordering rules within a service workflow. TEMS shall allow an operator to define or change the order in which different partition rules shall be executed or dispatched.

Defining relationship (AND/OR) between different rules with in a service workflow. TEMS should allow an operator to define a relationship (without the need to type in anything) of ANDing or ORing between any set of rules.

Defining relationship (AND/OR) between different rules with in a service workflow. TEMS should allow an operator to define a relationship (without the need to type in anything) of ANDing or ORing between any set of rules.

Combine different service workflows. TEMS should allow one of more existing service work flows to be combined to merged to form a new service workflows.

Service workflows history and audits. TEMS should present to the operator a complete audit trail of the service work flows creation, modification or deletion.

Validation of service workflows during its creation or modification. Before a service work flow is created or modified on a network element, a validation rule runs on the node to make sure that the new service work flow being provisioned is not conflicting with any existing service workflow. An appropriate error message shall be presented to the user in the case of a validation failure. The newly created rules shall be checked with in or outside the work flow context to make sure there are no conflicts.

Collecting analytics on service workflows. TEMS should allow operators to enable/disable analytics on any service workflows. The attributes for the analytics to be collected for any service workflow shall be pre-defined. Operator shall be able to add, delete or modify from the default analytics template for any service workflows.

Customer association with service workflows. TEMS should allow operators to associate service workflows with an end customer.

Operator shall be able to define and configure workflows to handle different overload conditions. For example, in a case of an overload, if CPU usage on a particular card is more than the high threshold mark then for a particular kind of traffic (HTTO, Video), the workflow server 10 acts as a pass through. This pass through is enabled or disabled on the workflow server 10 by configuring workflows. The Operator can configure the following rules:

a. Application.Type=Http OR Application.Type=Video Streaming [Flow Partitioning Rule]
        i. Ssm.cpu-usage>cpu-high-threshold (e.g. 95%) [Overload Condition 'State']
        ii. Delete NPU rule to forward the packet to the CSM card. This enables pass through for any http video request [Action #1]
        iii. Non Service Impacting vs. Service Impacting [Action #2].
        iv. No Charging (pass through case) vs. still maintain Charging information for the subscriber [Action #3].
    b. Application.Type=Http OR Application.Type=Video Streaming [Flow Partitioning Rule]
        i. Ssm.cpu-usage<={cpu-high-threshold−5% of cpu-high-threshold (e.g. 95%)} [Overload Condition 'State']
        ii. Add NPU rule to forward the packet to the CSM card i.e. no pass through [Action #1].
        iii. Non Service Impacting vs. Service Impacting [Action #2].
        iv. No Charging vs. still maintain Charging information for the subscriber [Action #3].

Operator should be able to configure actions for the load distribution use case where CPU threshold on a particular card is more than the low threshold mark but smaller than the high threshold mark. We want operator to be notified (warning alarm) so that they can plan/budget the CSM capacity on the workflow server 10. Operator can configure the following rules:

a. Application.Type=Http OR Application.Type=Video Streaming [Flow Partitioning Rule]
        i. Ssm.cpu-usage<cpu-high-threshold (e.g. 95%) and Ssm-.cpu-usage>cpu-low-threshold (e.g. 75%) [Overload Condition 'State']
        ii. Raise a warning alarm to TEMS and indicate the full CSM capacity approaching condition to the operator [Action #1].
        iii. If this condition happens multiple times within a configured time interval (e.g., 1 day) then the alarm condition could be raised to a Major one [Action #2].
    b. Application.Type=HTTP OR Application.Type=Video Streaming [Flow Partitioning Rule]
        i. Ssm.cpu-usage<=<={cpu-low-threshold−5% of cpu-low-threshold (e.g. 75%)} [Overload Condition 'State']
        ii. Clear the alarm condition [Action #1].

A user interface flow for provisioning a service workflow can be a three to four step process (launched all from the same graphical user interface (GUI) screen) where each step collects different information from the end user. The stages and the type of information to be collected at each stage are described below.

1. (Step-1) Flow Partitioning
    a. User is presented a screen with a drop down menu item indicating an option to select Layer-4 to Layer-7 flow partitioning. Depending on the selected layer, attributes specific to that layer are shown with a check box allowing users to select the attributes they want for the flow partition. Eg:-HTTP.URL, GTP.TID, IP.Proto, UDP.Port, DNS.URL etc.

Flow Partitioning Rule Examples
HTTP.URL=http://www.nytimes.com
HTTP.Referer begins with http://www.nytimes.com
DNS.QueryName finishes with nytimes.com
HTTP.URL contains nytimes
IP.TotLen<1000
IP.TotLen>1000
DNS.QueryName !finishesWith nytimes.com 2. (Step-2) Flow Dispatching
    a. A next screen presents to the end user a pre-defined set of 'Services' where the results of flow partitioning shall be dispatched to. The list of services can include, but are limited to, analytics like Mobile Latency, firewall like 'gatekeeper', Content Filter, CALEA Filter, Video or MSISDN services.

An example of a transaction for charging can be configured as follows:
HTTP.URL finishes with .mp3 and HTTP.State=RESP_OK (indicates and MP3 file was downloaded).

Actions on the above can be defined as:
Drop packet
Send packet to service with value (should be able to include things like charging values, i.e., HTTP.TotLen)
Redirect to URL (should be able to build URL dynamically from flow partitioning .

3. (Step-3) Flow Pipelining
    a. A next screen presents to the user the order in which he/she wants to the dispatched flows to be applied.

4. (Step-4) Workflow Analytics
    a. Based on the type of the service work flow, this screen can present to the end user a pre-defined set of analytics parameter that can be collected for a particular workflow or it could present a dynamic list of parameters that user can select to be collected as part of the service workflow analytics.

Figure 5:
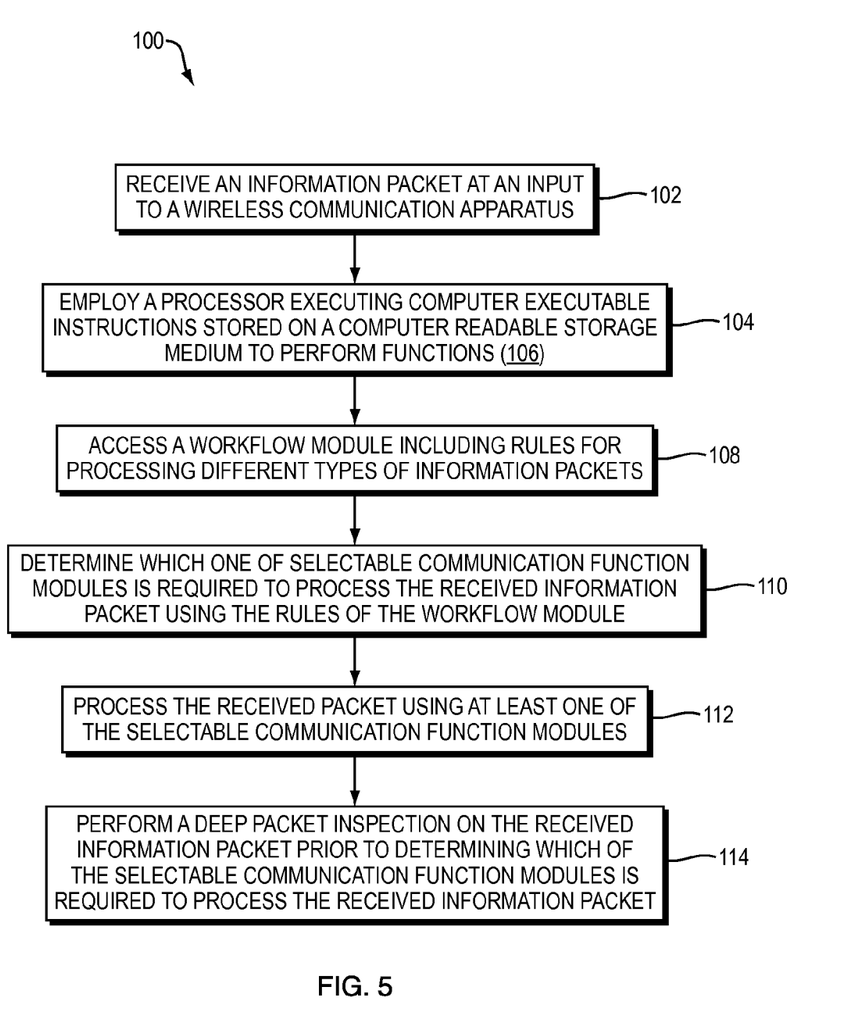
FIG. 5 is a flow diagram.

As shown in FIG. 5, a workflow process 100 includes receiving (102) an information packet at an input to a wireless communication apparatus.

The workflow process 100 employs (104) a processor executing computer executable instructions stored on a computer readable storage medium to perform functions (106).

The functions (106) include accessing (108) a workflow module including rules for processing different types of information packets, determining (110) which one of selectable communication function modules is required to process the received information packet using the rules of the workflow module, and processing (112) the received packet using at least one of the selectable communication function modules.

The workflow process 100 may include performing (114) a deep packet inspection on the received information packet prior to determining which of the selectable communication function modules is required to process the received information packet.

Processing (112) the received packets may include using the workflow module to coordinate the selectable communication function modules. All information flows through the workflow module to the selectable communication function modules and no information flows directly between the selectable communication function modules.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A wireless communications system comprising:
   a workflow server residing in a mobile communications network, the workflow server including at least one network processor, and the workflow server accessible by a plurality of mobile subscribers;
   at least one computer readable storage medium storing computer executable instructions that, when executed by the at least one network processor in the workflow server residing in the mobile communications network, implement components comprising:
   a workflow module comprising sets of workflow instructions for processing different types of information packets from the plurality of mobile subscribers;
   a deep packet inspection module for inspecting a received packet and providing information about the packet to the workflow module; and
   selectable communication function modules, the workflow module coordinating processing of the received packet using selected ones of the selectable communication function modules based on the information about the packet provided by the deep packet inspection module.

2. The system of claim 1 wherein the sets of workflow instructions are capable of being modified.

3. The system of claim 1 wherein the components further comprise a subscriber module for inspecting the received packet and providing at least one subscriber attribute to the workflow module.

4. The system of claim 1 wherein the components further comprise a network module for inspecting the received packet and providing at least one network protocol attribute to the workflow module.

5. The system of claim 1 wherein the selectable communication function modules comprises a content filtering module.

6. The system of claim 1 wherein the selectable communication function modules comprises a hypertext transfer protocol (HTTP) proxy module.

7. The system of claim 1 wherein the selectable communication function modules comprises a video cache module.

8. The system of claim 1 wherein the selectable communication function modules comprises a video transcoding module.

9. The system of claim 1 wherein the selectable communication function modules comprises an analytics module.

10. The system of claim 1 wherein the selectable communication function modules comprises a firewall module.

11. The system of claim 1 wherein the selectable communication function modules comprises a fee calculator.

12. The system of claim 1 wherein the selectable communication function modules comprises a policy enforcement module.

13. The system of claim 1 wherein the rules for processing different types of information packets are configurable by an operator.

14. The system of claim 1 wherein the information packets contain a type of information selected from the group consisting of text, audio, video, multimedia, subscriber information, mobile TV, protocol information and Internet.

15. The system of claim 1 wherein additional functional modules may be added to the selectable communication function modules by an operator.

16. A method comprising:
in a mobile communications network, receiving an information packet from a mobile communications device at an input to a workflow server residing in a mobile communications network, the workflow server being accessible by a plurality of mobile subscribers and having a network processor; and
employing the network processor of the workflow server executing computer executable instructions stored on a computer readable storage medium to perform the following functions:
performing a deep packet inspection on the received information packet to determine a packet type matching the received information packet
accessing a workflow module comprising rules for processing different types of information packets;
subsequent to performing the deep packet inspection, determining which one of selectable communication function modules is required to process the received information packet based on the packet type matching the information packet and using the rules of the workflow module; and
processing the received information packet using at least one of the required selectable communication function modules.

17. The method of claim 16 wherein the processing the received packets further comprises using the workflow module to coordinate the selectable communication function modules.

18. The method of claim 17 wherein all information flows through the workflow module to the selectable communication function modules and no information flows directly between the selectable communication function modules.

19. A mobile communications network workflow server for wireless mobile communication comprising:
a mobile communications network workflow server interface receiving information packets in the mobile communications network from a first network entity, the workflow server interface being accessible by a plurality of mobile subscribers; and
a computing platform residing in the mobile communications network workflow server processing the received packets, the computing platform comprising:
a workflow module;
a deep packet inspection module for inspecting the received packets and providing information about the packets to the workflow module; and
selectable communication function modules, the workflow module coordinating processing of the received packets using selected ones of the selectable communication function modules, the selection of the selectable communication function modules being based on the information about the packets provided by the deep packet inspection module, the network interface further transmitting processed information packets to a second network entity.

20. A system comprising:
a mobile communications network workflow server for establishing communication between a first network entity and a second network entity, the mobile communications network workflow server being accessible by a plurality of mobile subscribers, the workflow server comprising:
a network interface receiving information packets from a first network entity;
at least one network processor; and
at least one computer readable storage medium storing computer executable instructions that, when executed by the at least one network processor of the mobile communications network workflow server, implement components comprising:
a workflow module comprising rules for processing different types of information packets;
a deep packet inspection module for inspecting the received packets and providing information about the packets to the workflow module; and
selectable communication function modules comprising:
a content filtering module;
a HTTP proxy module;
a video cache module;
a video transcoding module;
an analytics module;
a firewall module;
a charging module;
a policy enforcement module;
a traffic steering module; and
a latency service module;
the workflow module selecting at least one selectable communication function module for processing a corresponding packet based on the information about the packet provided by the deep packet inspection module, the workflow module coordinating processing of the received packets using the corresponding selected ones of the selectable communication function modules and the network interface further transmitting processed information packets to a second network entity, thereby establishing communication between the first and second network entities.

* * * * *